Patented May 29, 1945

2,376,930

UNITED STATES PATENT OFFICE 2,376,930

HALOGEN SUBSTITUTED ACYLAMINO SULPHONIC ACIDS OF THE AROMATIC SERIES AND THEIR MANUFACTURE

Henry Martin, Basel, Hans Heinrich Zaeslin, Riehen, and Rudolf Hirt, Curt Glatthaar, and Alfred Staub, Basel, Switzerland, assignors to J. R. Geigy A. G., Basel, Switzerland No Drawing. Application June 15, 1942, Serial No. 447,180. In Switzerland June 16, 1938

3 Claims. (Cl. 260—506)

This application is a continuation-in-part of application Ser. No. 278,954, filed June 13, 1939 (now U. S. Patent No. 2,311,062).

This invention relates to the production of halogen substituted acyl amino sulphonic acids, the products being useful for various purposes in industry e. g. for protecting wool and other substances against damage by moths, the protection being very fast to washing and fulling, and in some cases as disinfecting agents, bactericides, fungicides, and seed steeping materials.

According to the present invention halogen substituted acyl amino sulphonic acids of the aromatic series are produced by the treatment of carbonic acid derivatives or substances or mixtures of substances forming these compounds which may also contain sulphonic acid groups with isocyclic amines or aminosulphonic acids containing replaceable hydrogen at the nitrogen atom, the reaction components being so chosen that at least one halogen atom and a sulphonic acid group are present in the final product.

Both substituents may also be introduced by after-treatment, that is by halogenation of the not or not highly halogenated acylamino compounds or by subsequent sulphonation of the not or not sufficiently sulphonated compounds.

As carbonic acid derivatives, which may be used for condensation, there are suitable chlorides or esters, amides, imides, or anhydrides of carbonic acid, whilst under carbonic acid chlorides there are understood: carbonylchloride, aliphatic, araliphatic, aliphatic-aromatic and aromatic carbamic acid chlorides. Halogen and/or alkyl substituted aromatic and aliphatic-aromatic carbamic acid chlorides have proved to be particularly valuable.

The condensation products in question may, however, also be obtained by the addition of isocyanates, especially of halogen- and/or alkyl-substituted aromatic-isocyanic acid esters, to aromatic amino sulphonic acids. Similar bodies are formed by the addition of aromatic carbamic acid-chloride sulphonic acids and isocyanate sulphonic acids respectively to suitable aromatic amines. It will be understood that similar products can be obtained by warming, melting or heating, in suitable solvents or suspension media, the amino sulphonic acids with urea, with separation of ammonia. Furthermore, by sulphonating completely condensed, difficulty soluble or insoluble ureas, containing at least one halogen atom, sulphonic acids with surprisingly good properties can be obtained. Or alkyl- or aryl-carbonic acid azides lead by condensation with amino sulphonic acids, with the development of nitrogen, to urea derivatives.

In all these methods the substitution of the components must be effected in such a manner that at least one halogen atom and one sulphonic acid group are present in the final product. These may be present in either of the reaction components or even in both at the same time.

The carbamic acid chlorides and isocyanic acid esters, used as initial material, can be obtained by the known processes. By treatment of primary or secondary aliphatic, aliphatic-aromatic, aromatic, araliphatic, araliphatic-aromatic amines, such as aniline, toluidine, 4-chloraniline, 3:4-dichloraniline, 2:5-dichloraniline, 2:4-dichloraniline, 3-chloro-4-methyl-6-methoxy-aniline, 3-chloro-4-methyl-6-ethoxyaniline, 3:4-dichloro-6-methoxy-aniline, 4-nitraniline, ethylaniline, 4-laurylaniline, laurylphenylamine, diphenylamine, 2-amino-4:4'-dichlorodiphenyl ether, 4'-chloro-4-aminodiphenyl-sulphone, 3:4:5-trichloraniline, 2:4:5-trichloraniline, laurylamine, α-dodecylbenzylamine, etc., with phosgene a simple reaction produces the carbamic acid chlorides. By suitable conversion known per se the latter, obtained from the corresponding primary amines, can be converted easily into isocyanic acid ester.

As aromatic amines there are preferably suitable amino sulphonic acids, for example the sulphonic acids of the aminodiphenylmethanes, aminodiphenylamines, aminobenzanilides. In this case there are especially suitable halogen and/or alkyl substituted derivatives of the above mentioned amino- or polyamino-sulphonic acids, such as 3:4-dichloro-4'-aminodiphenylamine-2'-sulphonic acid, 4:4'-dichloro-2-amino-1:1'-diphenylmethane-2'-sulphonic acid, 4-chloro-4'-aminodiphenylketone-3-sulphonic acid, 3'-aminobenzoyl-3:4-dichloraniline-6-sulphonic acid.

By a suitable selection of the substitution it is possible to construct products with one or more sulphonic acids. For example, by the action of phosgene on the above-defined halogenated amino-mono-sulphonic acids, there result ureas with two sulphonic acid groups. On the other hand, for example, by the action of specified carbamic acid chlorides, especially of halogenated, aliphatic-aromatic carbamic acid chlorides on amino-sulphonic acids, there are formed ureas with one sulphonic acid group. The invention thus concerns symmetrical and unsymmetrical urea sulphonic acids as well as those which at the nitrogen appear more or less completely alkylated, aralkylated or arylated.

By condensation of aminosulphonic acids or alkylaminosulphonic acids with N-primary or secondary carbamic acid chlorides it is possible to produce di-, tri- and tetrasubstituted ureas. By conversion of aminosulphonic acids and alkylaminosulphonic acids with nitro-urea or cyanate, there are formed mono- and di-substituted unsymmetrical urea derivatives. The latter can for example be further condensed with acid chlorides, alkyl chlorides, aldehydes or the like. The condition, however, always remains that after condensation at least one halogen atom and one sulphonic acid group are present in the reaction product.

The same or similar compounds are obtained in the most cases if the condensations are performed with the sulphonic-acid-group-free amines and at the end of the reaction only the solubility of the end products is produced by a succeeding sulphonation. If the solubility of sulphonic-acid groups containing acylamino compounds should still be enhanced, this can likewise be done by subsequent sulphonation.

From the iso-cyclic aminosulphonic acids containing exchangeable hydrogen at the nitrogen atom there may be named amongst others halogenated aminodiphenyl-methane-sulphonic acids as particularly convenient.

By usual halogenation of completely formed, not or not highly halogenated acylamino sulphonic acids which are obtained according to the above process from reactive carbonic acid-derivatives or such compounds yielding substances or mixtures of substances and isocyclic amines or aminosulphonic acids having exchangeable hydrogen at the nitrogen atom, one obtains, however, also easily the corresponding halogenation products which are also well adapted for determined purposes. By this means, there are obtained in part the same acylamino-sulphonic acids as they are obtainable by use of halogenated amines or aminosulphonic acids, in part, however, also substitution products halogenated in other positions. It is particularly to be noted that by use of different halogens one obtains new compounds technically not available heretofore.

The herein claimed symmetrical and especially unsymmetrical urea sulphonic acids are predominantly suitable for protecting wool, feathers, furs, hair, paper, textiles, leather, natural or artificial fibres, or articles containing these substances from moths and other textile destructive grubs.

The pronounced fastness to washing and fulling of the products claimed is particularly worth mentioning. By suitable substitution they are also suitable as disinfecting agents, as bactericides, fungicides and insecticides, as excellent mercury-free seed steeping materials, as valuable agents against blood parasites and also as agents for use in the textile industry.

The following examples illustrate the process, the parts being by weight, where nothing other is said.

Example 1

10 parts of 4-amino-4'-chloro-1:1'-diphenylamine-2-sulphonic acid, produced by the known process from p-chlor-aniline and p-chloronitrobenzenesulphonic acid, are dissolved in 150 parts of water and the necessary quantity of soda, 25 parts of crystalline sodium acetate are added and phosgene is passed through at 30–40° C. until no more amine is present. The paste precipitated with acid is separated, converted with soda into the sodium salt and salted out with cooking salt. The product, a grey powder, dried in vacuo, is clearly soluble in water. The yield is excellent.

Instead of the above diphenylaminesulphonic acid there may also be used another one as for example 4-amino-3':4'-dichloro-1:1'-diphenylamine-2-sulphonic acid or 4-amino-4':6'-dichloro-1:1'-diphenylamine-2-sulphonic acid.

Example 2

103 parts by weight of nitro-p-chlorobenzylchloride, boiling point 11 mm. 160–170° C., produced by nitrating p-chlorobenzylchloride, are stirred with 300 parts by volume of chlorobenzene and 100 parts of aluminium chloride at 25° C. until hydrochloric acid ceases to be formed. The excess chlorobenzene, after decomposition of the aluminium chloride with ice is driven off with steam, the residue is ethered out, dried and distilled under reduced pressure. The condensation product, probably 2-nitro-4:4'-dichloro-1:1'-diphenylmethane boils at boiling point 15 mm. 220–230° C.

By reduction with iron there is obtained the 2-amino-4:4'-dichloro-1:1'-diphenylmethane, boiling point 15 mm. 220–230° C.

55 parts of this base are introduced into 500 parts of sulphuric acid monohydrate and stirred at 90–100° C. for 2 hours; then it is cooled, poured on to ice, sucked off, washed with water and dried. The 2-amino-4:4'-dichloro-1:1'-diphenylmethane-2'-sulphonic acid forms a white powder of very sweet taste. 10 parts of this diphenylmethane sulphonic acid are dissolved in 150 parts of water by means of soda, treated with the necessary quantity of crystalline sodium acetate and phosgene is introduced at 30–40° C. until the azo reaction has disappeared. The diphenylmethane urea is precipitated when the solution is exactly neutralised by means of soda. After drying under reduced pressure it forms a bright powder which dissolves clear in water.

Example 3

16.5 parts of the 2-amino-4:4'-dichloro-1:1'-diphenyl-methane-2'-sulphonic acid, described in Example 2, are dissolved in 100 parts by volume of dry pyridine, and into the solution there are introduced at 10–15° C., whilst thoroughly stirring, 10 parts of 3:4-dichlorophenylisocyanate in small portions. After 1 hour the azo reaction has disappeared, the reaction mixture is then treated with steam until no further pyridine passes over. The residue is received in one litre of water and filtered hot. From the hot filtrate there separates on cooling the N-2'-(4''-chloro-2''-sulphobenzyl)-5'-chloro-phenyl-N'-3:4-dichlorophenyl urea, in white flakes. They are sucked off, washed with a little water and dried in vacuo. The yield is quantitative.

Instead of 3:4-dichlorophenylisocyanate there may be used 4-chlorophenylisocyanate, 3-chlorophenylisocyanate, 2-chlorophenylisocyanate, 4-methylphenylisocyanate, 2:4-dichlorophenylisocyanate, 2:5-dichlorophenylisocyanate, 2:4:5-trichlorophenylisocyanate, 3:4:5-trichlorophenylisocyanate.

Example 4

1/20 mol. of m-aminobenzoyl-3:4-dichloroanilide-6-sulphonic acid are dissolved in 100 parts by volume of dry pyridine, and the solution, whilst stirring and cooling, is treated slowly at 10–15° C. with 10 parts of 3:4-dichlorophenyl carbamic acid chloride. After introducing the latter the whole is stirred for another 1½ hours until the azo reaction disappears. Then it is treated with some soda and the pyridine is blown off with steam. The residue is introduced into 1 litre of hot water, rapidly boiled, filtered hot and the filtrate is treated with brine. The condensation product is precipitated as a grey resin; it is separated and dried in vacuo.

m - aminobenzoyl -3:4- dichloroanilide -6- sulphonic acid is obtained by conversion of 3-nitrobenzoylchloride with 1-amino-3:4-dichlorobenzene-6-sulphonic acid in pyridine. The nitrobody is reduced with iron according to known processes and is precipitated from the soda-alkaline filtrate obtained by means of hydrochloric acid. Instead of the 3:4-dichlorophenyl carbamic acid chloride may be used the corresponding isocyanate or also the compounds mentioned in the general part of the description of this specification.

*Example 5*

31.5 parts of 4-chloro-4'-amino-1:1'-diphenyl-ketone-3-sulphonic acid are dissolved in 100 parts by volume of dry acetone and mixed while stirring at 10-15° C. by portions with the calculated quantity of 3:4-dichlorophenyl-isocyanic acid ester and further stirred at room temperature until there is no more free aminogroup detectable with nitrite. After alkalinisation with a 10 per cent solution of soda the acetone is blown off with steam, the residue is boiled up with two litres of water while steam is introduced thereinto, filtered hot and the condensation product is precipitated from the filtrate by means of a common salt solution in form of a thick resin. The same is separated and dried in vacuo. The urea obtained in form of a colorless powder is well soluble in warm water.

What we claim is:

1. The urea derivatives of the following general formula

R—CH$_2$—R'—NH.CO.NH—R$^2$ wherein R and R' each represents a phenyl nucleus with a substituent selected from the group consisting of H, alkyl and halogen and R$^2$ means a radical selected from the group consisting of the radicals (R—CH$_2$—R') and a phenyl radical, the whole molecule containing at least one SO$_3$H group in one of the radicals R, R' and R$^2$ and at least one halogen atom in the same radicals R, R' and R$^2$, these compounds being useful for durably protecting wool and other substances against moths.

2. The halogen substituted urea of the following formula

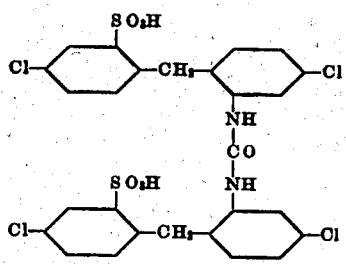

being particularly useful for durably protecting wool and other substances against moths.

3. The halogen substituted urea of the following formula

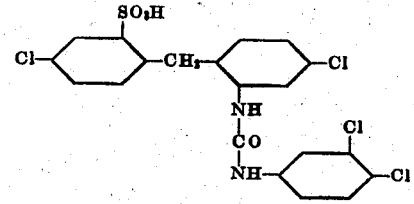

being particularly useful for durably protecting wool and other substances against moths.

HENRY MARTIN.
HANS HEINRICH ZAESLIN.
CURT GLATTHAAR.
ALFRED STAUB.
RUDOLF HIRT.